United States Patent
Walton et al.

(10) Patent No.: US 10,715,338 B2
(45) Date of Patent: Jul. 14, 2020

(54) MANAGEMENT OF PUBLIC KEY CERTIFICATES WITHIN A DISTRIBUTED ARCHITECTURE

(71) Applicant: Microsoft Technology Licensing, LLC, Redmond, WA (US)

(72) Inventors: John Michael Walton, Woodinville, WA (US); Shawn Valentine Hernan, Redmond, WA (US); Shrikant Adhikarla, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 256 days.

(21) Appl. No.: 15/901,080

(22) Filed: Feb. 21, 2018

(65) Prior Publication Data

US 2019/0260595 A1 Aug. 22, 2019

(51) Int. Cl.
| | | |
|---|---|---|
| *H04L 9/32* | (2006.01) | |
| *H04L 9/08* | (2006.01) | |
| *G06F 21/33* | (2013.01) | |
| *H04L 29/06* | (2006.01) | |

(52) U.S. Cl.
CPC ............ *H04L 9/3268* (2013.01); *G06F 21/33* (2013.01); *H04L 9/0819* (2013.01); *H04L 9/0861* (2013.01); *H04L 9/3265* (2013.01); *H04L 63/0823* (2013.01); *H04L 63/20* (2013.01); *H04L 2209/38* (2013.01)

(58) Field of Classification Search
CPC .................................................... H04L 9/3268
See application file for complete search history.

(56) References Cited

U.S. PATENT DOCUMENTS

| | | | | |
|---|---|---|---|---|
| 9,225,743 | B1 | 12/2015 | Naik | |
| 9,660,978 | B1 * | 5/2017 | Truskovsky | ............ H04L 9/006 |
| 10,425,401 | B1 * | 9/2019 | Pecen | .................... H04L 9/3247 |
| 2005/0015600 | A1 * | 1/2005 | Miyazaki | ................ G06F 21/64 |
| | | | | 713/176 |
| 2007/0245401 | A1 | 10/2007 | Brabson et al. | |

(Continued)

OTHER PUBLICATIONS

"All That Glitters is No Longer Gold—Shylock Trojan Gang Hit by Takedown", Retrieved from https://www.symantec.com/connect/blogs/all-glitters-no-longer-gold-shylock-trojan-gang-hit-takedown, Jul. 10, 2014, 11 Pages.

(Continued)

*Primary Examiner* — Simon P Kanaan
(74) *Attorney, Agent, or Firm* — Buckley, Maschoff & Talwalkar LLC

(57) ABSTRACT

A system includes determination of first public key certificate policies based on first data files, generation of a first public key certificate conforming to the first public key certificate policies, storage of the first public key certificate in a secret store system, reception of a second public key certificate, determination of second public key certificate policies based on second data files stored in the secret store system, determination of whether the received second public key certificate conforms to the second public key certificate policies, and storage of the second public key certificate in the secret store system if it is determined that the received second public key certificate conforms to the second public key certificate policies.

15 Claims, 7 Drawing Sheets

(56) References Cited

U.S. PATENT DOCUMENTS

| | | | |
|---|---|---|---|
| 2008/0065881 A1* | 3/2008 | Dawson | H04L 9/0822 713/165 |
| 2011/0231662 A1 | 9/2011 | Sato et al. | |
| 2012/0117608 A1 | 5/2012 | Metke et al. | |
| 2017/0093570 A1* | 3/2017 | Maruyama | H04L 9/0891 |

OTHER PUBLICATIONS

"Analysis of the KINS Malware", Retrieved from https://blog.fox-it.com/2013/07/25/analysis-of-the-kins-malware/, Jul. 25, 2013, 4 Pages.

"Reversal and Analysis of Zeus and Spyeye Banking Trojans", In Technical White Paper of Software Assurance, Retrieved on: Apr. 26, 2017, 31 Pages.

"SSL Blacklist", Retrieved from https://sslbl.abuse.ch/, Retrieved on: Apr. 26, 2017, 50 Pages.

Boeyen, et al., "Internet X.509 Public Key Infrastructure Certificate and Certificate Revocation List (CRL) Profile", Retrieved from https://www.rfc-editor.org/rfc/pdfrfc/rfc5280.txt.pdf, May 2008, 151 Pages.

Boneh, Dan, "Twenty Years of Attacks on the RSA Cryptosystem", In Proceedings of Notice of the AMS, vol. 46, Issue 2, Feb. 1999, pp. 203-213.

Brubaker, et al., "Using Frankencerts for Automated Adversarial Testing of Certificate Validation in SSL/TLS Implementations", In Proceedings of the IEEE Symposium on Security and Privacy, May 18, 2014, 16 Pages.

Chokani, et al., "Internet X.509 Public Key Infrastructure Certificate Policy and Certification Practices Framework", Retrieved from https://www.ietf.org/rfc/rfc3647.txt, Nov. 1, 2003, 95 Pages.

Georgiev, et al., "The Most Dangerous Code in the World: Validating SSL Certificates in Non-Browser Software", In Proceedings of the 2012 ACM Conference on Computer and Communications Security, Oct. 16, 2012, pp. 38-49.

"International Search Report and Written Opinion Issued in PCT Application No. PCT/US2019/017910", dated Apr. 11, 2019, 12 Pages.

Raywood, Dan, "Adobe confirms targeted attack on digital certificate code signing infrastructure,", Retrieved from https://www.scmagazineuk.com/adobe-confirms-targeted-attack-on-digital-certificate-code-signing-infrastructure/article/544509/, Sep. 28, 2012, 8 Pages.

Salah, et al., "Mathematical Attacks on RSA Cryptosystem", In Journal of Computer Science, vol. 2 , Issue 8, Retrieved on: Apr. 26, 2017, pp. 665-671.

Sancho, et al., "Finding Holes: Operation Emmental", In White Paper of a Trend Micro, Retrieved on: Apr. 26, 2017, 20 Pages.

Stevens, et al., "The first collision for full SHA-1", Retrieved from https://shattered.io/static/shattered.pdf, Feb. 23, 2017, 23 Pages.

Takayasu, et al., "Cryptanalysis of RSA with Multiple Small Secret Exponents", In Proceedings of Australasian Conference on Information Security and Privacy, Jul. 7, 2014, 2 Pages.

Yee, P, "Updates to the Internet X.509 Public Key Infrastructure Certificate and Certificate Revocation List (CRL) Profile", Retrieved from https://tools.ietf.org/pdf/rfc6818, Jan. 2013, 8 Pages.

* cited by examiner

MANAGEMENT OF PUBLIC KEY CERTIFICATES WITHIN A DISTRIBUTED ARCHITECTURE

BACKGROUND

Modern computing networks utilize public key certificates to establish trust and to secure communications between parties. Generally, a public key certificate binds a public key to a named entity, where the named entity is assumed to possess a private key corresponding to the public key. A signature or assertion which is generated using the private key can therefore be expected to have been generated by the named entity.

Certificate-based communication (e.g., via the Transport Layer Security (TLS) protocol) relies on certificates issued by trusted certificate authorities. The certificates conform to X.509 standards, which specify fields and extensions intended to control certificate usage and provide security to communications based thereon. An organization may receive certificates from external or internal certificate authorities, may store received certificates, and may deploy stored certificates to service nodes. The service nodes use the deployed certificates to establish communication with other services and end-users. End users and other services that establish communication with a service node can, with high probability, prove that the service node is the entity named in the public key certificate and therefore in possession of the corresponding private key as a means of establishing trust.

Management of an organization's certificate pipeline is challenging, especially in a distributed architecture and at scale. A certificate pipeline presents several entry points for inadvertent errors, corruption and attack, each of which should be monitored and configured to implement remedial processes. Pipeline management should also address evolving threats and standards, which may require regular re-evaluation of monitoring processes and of previously-stored certificates.

Efficient, effective and verifiable systems to manage public key certificates are desired.

DETAILED DESCRIPTION

The following description is provided to enable any person in the art to make and use the described embodiments. Various modifications, however, will remain readily apparent to those in the art.

Generally, some embodiments provide management of public key certificates throughout a certificate pipeline, including during issuance, storage and deployment. Embodiments may also detect indicators of system compromise during runtime based on the state of deployed public key certificates.

Some embodiments address a class of technical problems in secure communication channels, such as TLS, and mitigate cyberattacks. A technical solution to the technical problem, according to some embodiments, includes an evaluation engine and efficiently-configurable policies implemented at multiple points of an organization's public key certificate pipeline.

Figure 1:
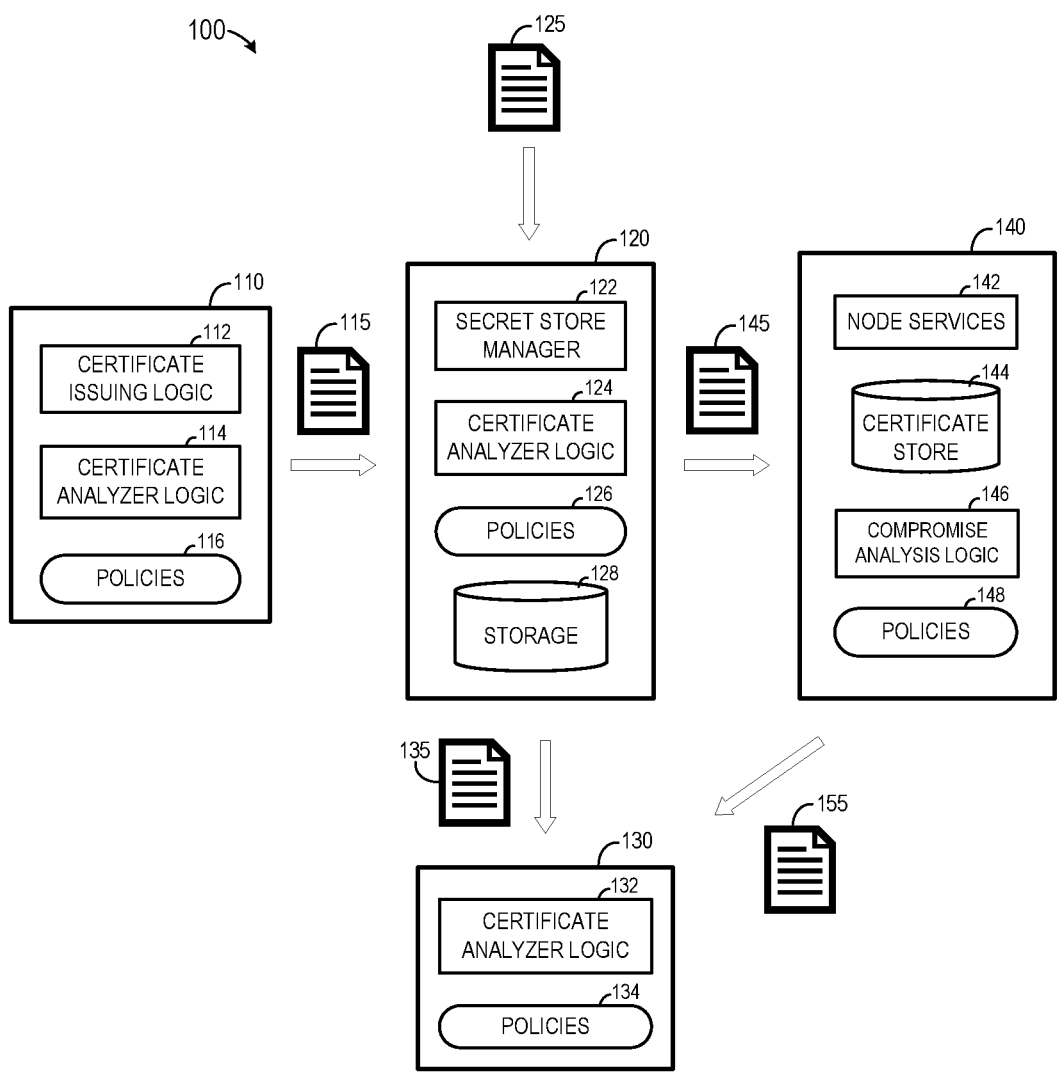
FIG. 1 is a diagram of a certificate pipeline according to some embodiments.

FIG. 1 is a block diagram of system 100 according to some embodiments. Embodiments are not limited to the FIG. 1 system. System 100 comprises components of a certificate pipeline used by an organization to issue, store, manage and deploy public key certificates. System 100 includes certificate authority 110, secret store 120, monitoring system 130 and service node 140. Each component of system 100 may be implemented by one or more computing devices (e.g., computer servers), storage devices (e.g., hard or solid-state disk drives), and other hardware as is known in the art. The components of system 100 may be located remote from one another and may communicate via any number of public or private networks.

Generally, certificates 115 are issued by certificate authority 110 and ingested by secret store 120. Secret store 120 may also receive certificates 125 from other sources. Monitoring service 130 may evaluate certificates 135 stored within secret store 120. Certificates 145 of secret store may be deployed to service node 140, which uses the certificates to support electronic communication (e.g., using the TLS protocol). Some embodiments operate to ensure that certificates located within system 100 are uncorrupted, meet organizational specifications and conform to current industry and organizational security standards.

Certificate authority 110 may be operated by a trusted third party, such as a Certificate Authority internal to or operated by the organization. Certificate authority 110 confirms the identity of a certificate requestor (e.g., a user or computer), and issues a certificate to the requestor. The certificate binds the identity of the requestor user or domain to a public key, and indicates certain expected usages of the public key. The requestor may provide the certificate to a remote server or client in order to establish communication with the remote computer. The remote computer attempts to locate certificate authority 110 within a locally-stored list of trusted certificate authorities. If certificate authority 110 is located in the list, the remote computer will verify that the certificate is authentic and whether the remote compute can prove through agreed-upon algorithms that it is in possession of the corresponding private key.

Certificate authority 110 includes certificate issuing logic 112 to verify a requested user or domain's identity and to issue a certificate as described above. Certificate issuing logic 112 is executed to issue certificates which conform to the applicable standard (e.g., X.509). The certificates typically present a hierarchical structure with well-known "root" certificate authorities at the top, lesser-known intermediary certificate authorities in the middle, and leaf certificates identifying an actual service or user. Logic 112, and other elements of system 100 to which functions are attributed to herein, may be implemented by executable program code and/or any suitable hardware.

Certificate analyzer logic 114 operates in conjunction with certificate issuing logic 112 to ensure that issued certificates conform to policies 116. Certificate issuing logic 114 may evaluate a certificate issued by certificate issuing logic 114, and/or may execute during the issuance process to ensure that all issued certificates conform to the policies of issuing logic 112 and policies 116. Certificate 115 is issued via execution of logic 112 and logic 114, and will therefore be referred to herein as a managed certificate.

According to some embodiments, policies 116 specify requirements for issued certificates which differ from the requirements enforced by certificate issuing logic 112. Policies 116 may be modified independent of analyzer logic 114, which allows for efficient modification of the requirements under which certificate authority 110 issues certificates. As will be described in detail below, policies 116 may be stricter than the X.509 standard enforced by certificate issuing logic 112, may assist in reinforcing the standard, may be partially or fully duplicative of the standard (e.g., to audit the performance of certificate issuing logic 112), and may assist in reducing attacks based on the current or future threat landscape. Policies 116 may be conditional based on the authority type of certificate authority 110, the location of certificate authority 110, the type of certificate requestor, and/or on any other attribute.

Secret store 120 may be used by an organization to maintain public key certificates, passwords, private keys, etc. Secret store 120 may receive managed certificate 115 and store managed certificate 115 in storage 128. Organizations and features in services may also enable customers to supply their own certificates or certificates that have already been issued by another certificate authority. Secret store 120 may therefore support ingestion and storage of Bring Your Own Certificates (BYOC) certificates received from customers. BYOC certificate 125 will be referred to as an unmanaged certificate, as it is not known whether certificate 125 was issued by a certificate authority using the above-described framework of certificate authority 110. Accordingly, the standards under which certificate 125 was issued and its resulting strength are unknown.

Secret store 120 is managed by secret store manager 122 as is known in the art. The functions of secret store manager 122 are supplemented by certificate analyzer logic 124. Certificate analyzer logic 124 may be provided as a package implementing an Application Programming Interface (API) usable by secret store manager 122 to evaluate a certificate with respect to policies 126 during BYOC ingestion. A BYOC certificate may be stored in storage 128 if it is determined that the BYOC certificate conforms to policies 126, and rejected (i.e., not stored in storage 128) if not. Policies 126 may be identical to or different from policies 116 of certificate authority 110.

Storage 128 may therefore store managed certificates issued by certificate authority 110 and unmanaged BYOC certificates which conform to policies 126. Since cryptography and security standards evolve over time, monitoring service 130 is provided to execute certificate analyzer logic 132 to fetch certificates from a data store (e.g., storage 128 of secret store 120) and evaluate the certificates based on policies 134. According to some embodiments, certificate analyzer logic 132 uses policies 134 to identify certificates which may have conformed to policies 116 or 126 when issued or received by secret store 120, but which are weak or vulnerable by current standards reflected in policies 134. This evaluation would also identify certificates which have been corrupted since their storage in storage 128, even if policies 134 were identical to policies 116 or 126.

Service node 140 provides any number or type of node services 142 to consumers as is known in the art. Service node 140 may use certificates stored in local certificate store 144 in order to provide such services. For example, during an initial TLS handshake with a communicating party, service node 140 retrieves its public key certificate and presents it to the communicating party as a verifiable token of identity. The TLS handshake proceeds to establish a communication link between service node 140 and the communicating party. Service node 140 thereafter provides services to the communicating party via the established communication link.

Service node 140 may receive deployed certificate 145 from secret store 120 and store certificate 145 in certificate store 144. In some embodiments, a deployment manager (not shown) manages deployment of certificates from one or more secret stores to one or more service nodes.

Service node 140 includes compromise analysis logic 146 and policies 148 according to some embodiments. Compromise analysis logic 146 may operate as described above with respect to certificate analyzer logic 114, 124 and 132 to evaluate certificates of certificate store 144 based on policies 148. Policies 148 may differ in whole or in part from policies 116, 126 and 134. Compromise analysis logic 146 may also operate to detect indicators of compromise (IOCs) in the service node 140. The detection of IOCs may also be based on policies 148, examples of which will be described below.

Service node 140 may transmit report 155 including any detected IOCs or weak certificates to monitoring service 130, or to the alerting or reporting pipeline of the organization. If a compromise is detected, the corresponding communication link and processes may be terminated.

Figure 2:
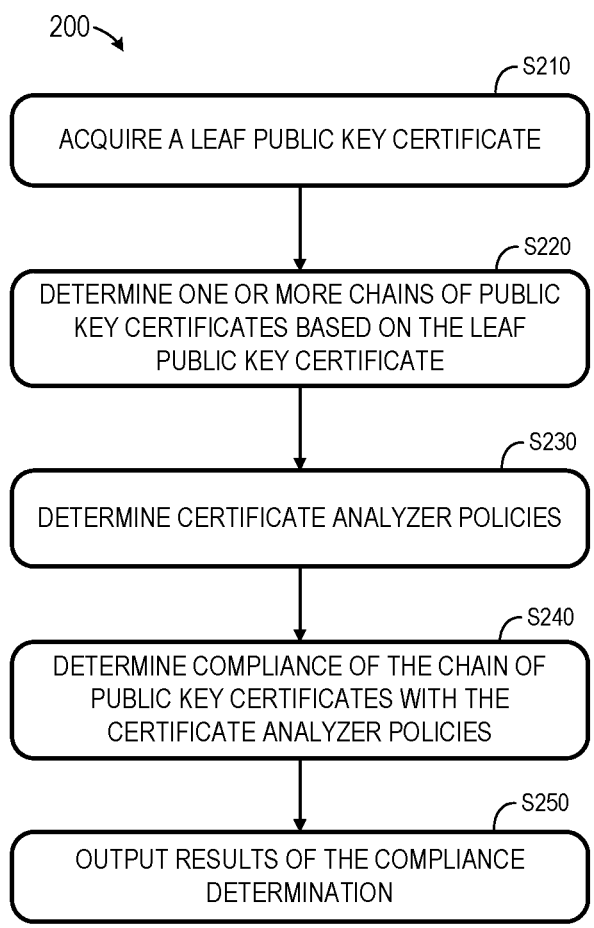
FIG. 2 is a flow diagram of a process to evaluate a public key certificate according to some embodiments.

FIG. 2 comprises a flow diagram of process 200 to evaluate a certificate according to some embodiments. Process 200 may be performed by one or more of certificate analyzer logic 114, certificate analyzer logic 124, certificate analyzer logic 132, and compromise analysis logic 146. In some embodiments, a processing unit (e.g., one or more processors, processing cores, processor threads) of a computing system executes program code to cause the computing system to perform process 200.

Process 200 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

A public key certificate is initially acquired at S210. The public key certificate may be acquired from local storage but embodiments are not limited thereto. The acquired public key certificate is a leaf certificate, in that it is the last certificate in a chain of higher-level certificates. The acquired public key certificate refers to one or more certificates in the chain, as does each certificate in the chain until a root certificate is reached. The root certificate may be bound to a certificate authority. The chain is determined at S220 by reading each reference back to the root certificate of the chain.

Certificate analyzer policies are determined at S230. The policies may be specific to the point of the certificate pipeline in which they are deployed. As will be described below, the policies may be configurable and deployed in stages across the certificate pipeline. For purposes of the present description of process 200, it will be assumed that the policies are determined at S230 based on stored policy information and that compliance with the policies is determined at S240.

The individual policies may be related to the public key leaf certificate or to the chain of public key certificates. Accordingly, violations of the policies may be associated with the public key leaf certificate or to the chain of public key certificates. Results of the compliance determination are output at S250. For example, each certificate's metadata may be associated with its determined violations and output as a serialized object, as a stored table or as a .csv file.

Figure 3:
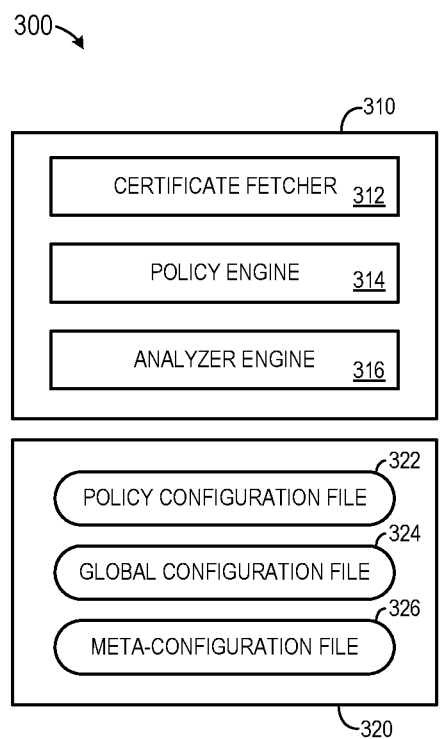
FIG. 3 is a block diagram of a program code and configuration files to implement certificate evaluation according to some embodiments.
Figure 4:
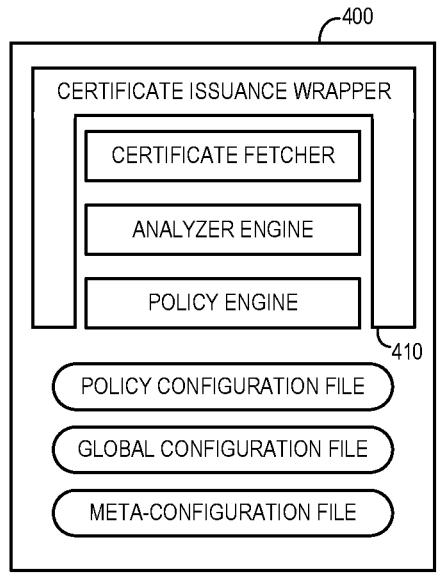
FIG. 4 is a block diagram of a program code and configuration files to implement certificate evaluation within a certificate authority according to some embodiments.
Figure 5:
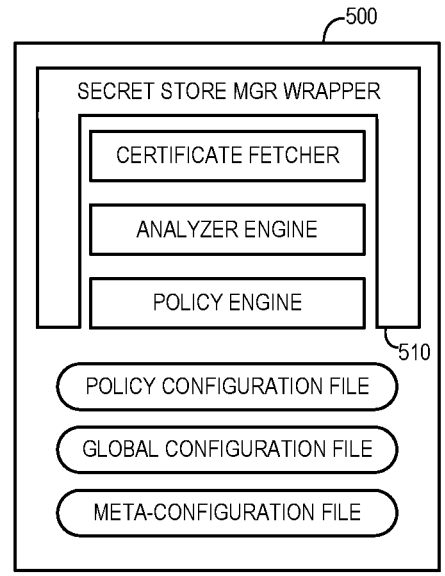
FIG. 5 is a block diagram of a program code and configuration files to implement certificate evaluation within a secret store according to some embodiments.
Figure 6:
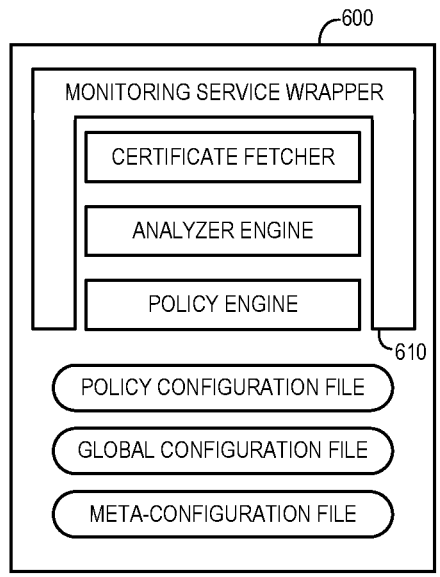
FIG. 6 is a block diagram of a program code and configuration files to implement certificate evaluation within a node scanner according to some embodiments.
Figure 7:
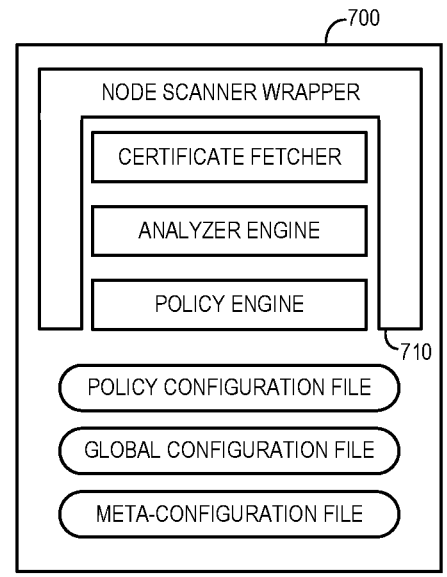
FIG. 7 is a block diagram of a program code and configuration files to implement certificate evaluation within a monitoring service according to some embodiments.

FIG. 3 illustrates architecture 300 of components to implement process 200 according to some embodiments. Architecture 300 includes engine architecture 310 and configuration file architecture 320. According to some embodiments, one or more of certificate analyzer logic 114, certificate analyzer logic 124, certificate analyzer logic 132, and compromise analysis logic 146 is implemented by engine architecture 310 and one or more of policies 116, 126, 134 and 148 is implemented by configuration file architecture 320, although the implementation details may differ as described below.

Certificate fetcher 312 operates to ingest public key certificates from a given configurable source. Examples of ingestion sources include node certificate store 144, secret store manager 122 (via REST calls), and local or remote certificate directories (e.g., a network file share). According to some embodiments, certificate fetcher is configured and deployed based on the relevant use case (i.e., its location in the certificate pipeline). For example, if certificate analyzer logic 132 of monitoring service 130 is implemented by architecture 310, certificate fetcher 312 is configured to fetch certificates from secret store 120. Certificate fetcher 312 may be implemented as an extensible platform which may be efficiently extended to support new ingestion sources.

Policy engine 314 may determine certificate analyzer policies as described above with respect to S230. According to architecture 300, the certificate analyzer policies are determined at runtime based on a policy definition specified in policy configuration file 322 and corresponding cryptographic standards specified in global configuration file 324. A policy definition may directly or indirectly relate to a specific vulnerability or weakness in a certificate, thereby compromising any authentication based thereon. Analyzer engine 316 applies the policies determined by policy engine 314 to the certificates fetched by certificate fetcher 312 at S240.

In one example, a policy definition of policy configuration file 322 may define a policy to enforce a standard for a key size being used for RSA encryption in a public key certificate and to assign a severity of violation if the key size is smaller than a certain standard. A sample eXtended Markup Language (xml) construct for the policy definition in policy configuration file 322 may be as follows:

```
<Cert Policy Element panel="CryptoPanel "
judge="WeakEndpointKeyArbiter"
descr="Key is smaller than required by CA or Browser requirements"
isselfsigned="1" severity="95"
securityrating="0" />
```

As described above, the value for the key size standard is decoupled from the policy definition and comes from global configuration file 324. For example, the key size may be defined in global configuration file 324 as follows:

```
<CertificateKeySize>
2048
</CertificateKeySize>
```

Policies may be added and deleted efficiently by virtue of the architecture of configuration files 320. Decoupling policy definitions from their cryptographic standards provides flexibility in changing the cryptographic standards without knowledge of how policies may be structured around these standards.

According to some embodiments, policies are associated with a "crypto" panel, an IOC panel, and a baseline panel. The crypto panel encapsulates policies for identifying certificates which are weak due to sub-standard certificate generation or obsolete cryptographic standards. The IOC panel includes policies to detect suspicious deltas in public key infrastructure due to an ongoing attack. The baseline panel includes other policies which may relate to the strength of a certificate. Meta-configuration file 326 may be modified by a user to enable or disable policy panels, and to specify a source from which certificate fetcher 312 is to acquire certificates. Accordingly, meta-configuration file allows a same set of engines 310, policy configuration file 322 and global configuration file 324 to be used at multiple deployment points of the certificate pipeline.

FIGS. 4 through 7 depict various instances of architecture 300 according to some embodiments. FIGS. 4 through 7 illustrate the modular nature of some embodiments and the ability to re-use various components while customizing others based on the scenario in which the instance is to be deployed.

Specifically, certificate issuance files 400 may include engines and configuration files described with respect to FIG. 3. However, the engines of certificate issuance files 400 are encapsulated within wrapper 410. Wrapper 410 may comprise any code which facilitates the use of the engines and configuration files by a certificate-issuing authority such as certificate authority 110. Similarly, wrappers 510, 610 and 710 facilitate usage of the engines and configuration files by a secret store manager, a monitoring service, and a node scanner.

Wrapper 510 vets BYOC unmanaged certificates received from external Certificate Authorities. Wrapper 510 may be implemented as a nuget package which can be used by secret store manager 122.

Monitoring service wrapper 610 may provide an organization with a holistic view of the state of certificates being used in its various services. This view may be useful to remove existing non-compliant certificates and also may facilitate detection of future non-compliance, due to dynamic crypto standards. Monitoring service wrapper 610 may be implemented as a web service which consumes certificates from all the secret stores of the organization.

Node scanner wrapper 710 may detect certificate having policy issues in operational time. Wrapper 710 also catch certificates which were for some reason never stored in organization's secret store. Wrapper 710 may be implemented as a nuget package.

Wrappers according to some embodiments may be implemented in hardware such as a Trusted Platform Module or Field-Programmable Gate Array, smartcards, or a self-encrypting disk. Embodiments may also be implemented into a network monitoring tool, or a host-based or network-based intrusion detection system, or large-scale analysis system which examines the data from a network of systems in parallel. Different wrappers could be implemented for organizational-level, service-by-service, 3rd-party or end-user policies.

As described above, each policy configuration file of FIGS. 4 through 7 may define one or more of the same policies, and two or more policy configuration files may be identical to one another in order to be applied at multiple points in the certificate pipeline. Similarly, each global configuration file may specify one or more of the same values. The meta-configuration files provide yet an additional degree of configuration freedom by allowing instance-specific enabling and disabling of particular policies/panels.

In one example according to some embodiments, an organization may change, or plan to change, a key size from 1024 bits to 2048 bits within a global configuration file of monitoring service files 600, in order to identify the certificates of a secret store which do not meet this new standard and thereby determine the organizational impact of requiring the larger key size. In another example, the key size may be changed from 1024 to 2048 within only the global configuration file of certificate issuance files 400, to ensure that newly-issued certificates meet this standard and that certificates located elsewhere in the pipeline will not be identified as weak if they do not meet this standard. New policies and cryptography values may therefore by deployed in a staged and iterative manner as well as applied for auditing or enforcement.

Figure 8:
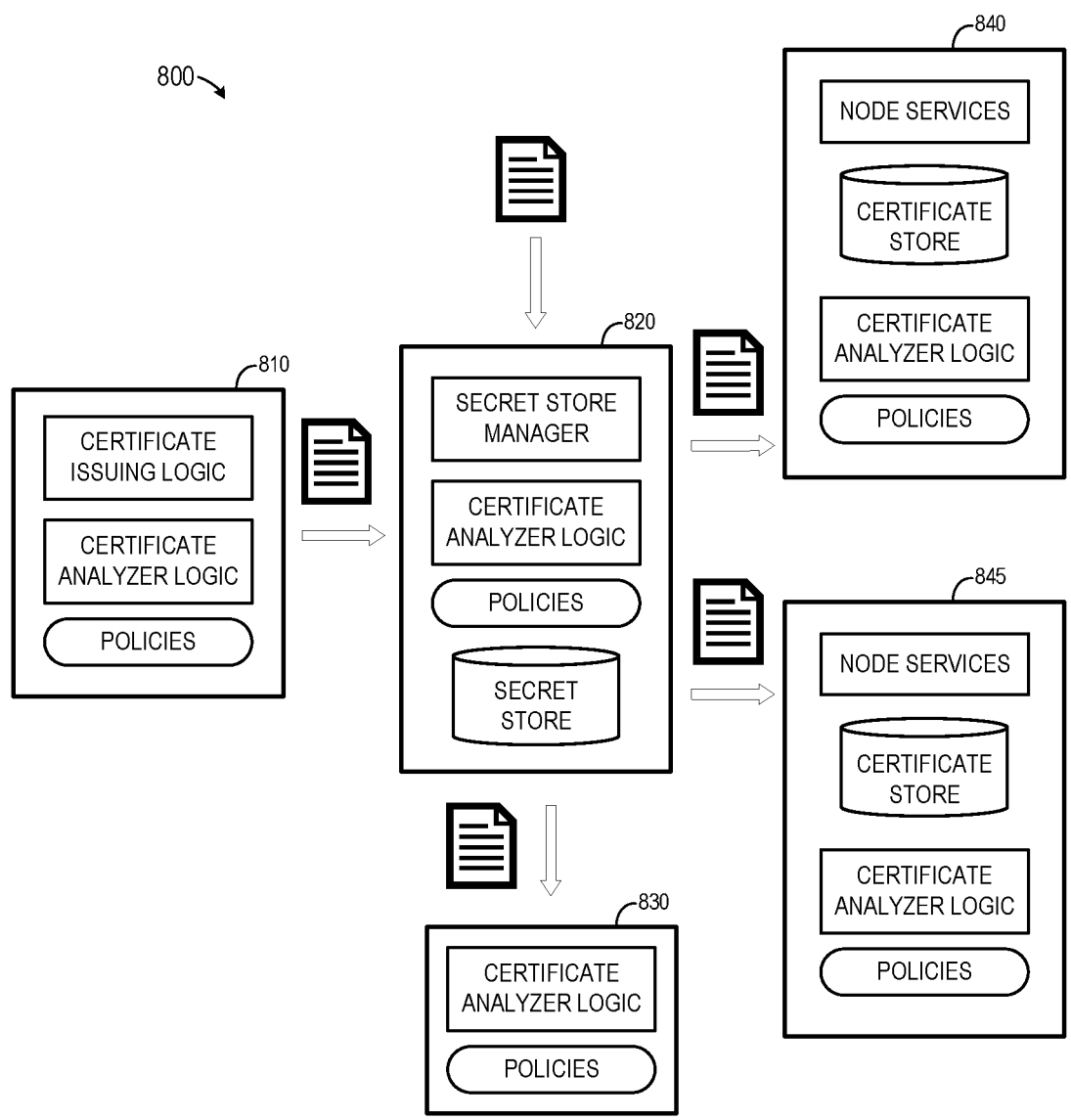
FIG. 8 is a diagram of a certificate pipeline in a multi-node architecture according to some embodiments.

FIG. 8 is a block diagram of system 800 according to some embodiments. System 800 includes certificate authority 810, secret store 820, monitoring system 830 and service nodes 840 and 845. Each component of system 800 may be implemented as described with respect to similarly-named components of system 800.

System 800 illustrates an arrangement including more than one service node. Embodiments may include any number of service nodes. In some embodiments, the policies of service node 840 differ in whole or in part from the policies of service node 845. For example, service node 840 may require stronger security than service node 845 and may therefore implement corresponding policies.

Figure 9:
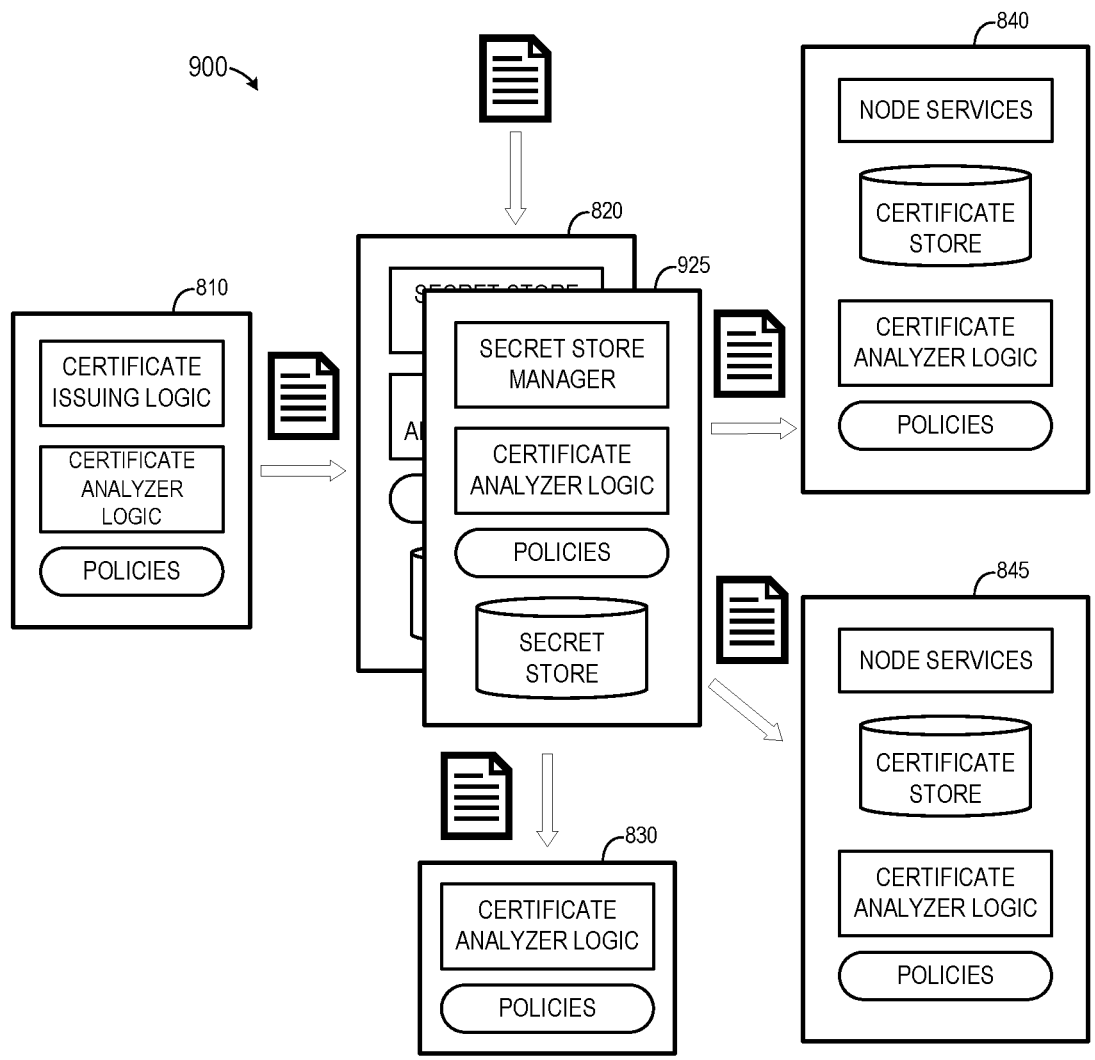
FIG. 9 is a diagram of a certificate pipeline in a multi-secret store architecture according to some embodiments.

System 900 of FIG. 9 adds a second secret store 925 to the FIG. 8 architecture. In some embodiments, secret store 830 stores certificates for use by service nodes 840 and 845, while secret store 925 stores certificates for internal organization usage. Service nodes 840 and 845 utilize certificates from each of secret stores 820 and 925 in some embodiments. Each of secret stores 820 and 925 may store different policies to be evaluated by their associated certificate analyzer logic, and each may be monitored by monitoring service 830 as described above.

A discussion of policies which may be implemented by some embodiments now follows. Embodiments are not limited to the following policies.

Crypto Panel policies

1. Weak Endpoint Key

Determines whether the key size of the X.509 certificate is smaller than required by Certificate Authority/Browser requirements with respect to current security standards.

2. Weak Endpoint RSA Exponent

The public key in the RSA system is a tuple of integers (N, e), where N is the product of two primes p and q, and e is the public exponent. The secret key is given by an integer d satisfying $e^d=1 \mod(p-1)(q-1)$. This policy determines whether the value of exponent e is even or small, which may enable certain attacks on X.509 certificates.

3. Compromised Endpoint Key

Determines whether the certificate's private key has either been compromised or is weaker than required by current security standards. Compromised keys will be checked against a constantly updated database of compromised certificates.

4. Weak Intermediate Key

Determines whether the key size for intermediate certificates is smaller than required by Certificate Authority/Browser requirements with respect to current security standards.

5. Weak Intermediate RSA Exponent

Determines whether the value of exponent e is even or small for intermediate certificates, which may enable certain attacks on X.509 certificates.

6. Compromised Intermediate Key

Determines whether the intermediate certificate's private key has either been compromised or is weaker than required by current security standards. Compromised keys will be checked against a constantly updated database of compromised certificates.

7. Weak Root Key

Determines whether the key size for the root certificate is smaller than required by Certificate Authority/Browser requirements with respect to current security standards.

8. Weak Root RSA Exponent

Determines whether the value of exponent e is even or small for the root certificate, which may enable certain attacks on X.509 certificates.

9. Compromised Root Key

Determines whether the root certificate's private key has either been compromised or is weaker than required by current security standards. Compromised keys will be checked against a constantly updated database of compromised certificates.

10. Missing DSA Parameters

Determines whether the DSA key in the chain is missing required key parameters or the export of the key parameters for cryptographic operation throws an exception. The latter might be due to a key parameter being malformed and thus insecure for cryptographic operations.

11. Non-Recommended Endpoint Curve

Determines whether endpoint ECC curves being used comply with a whitelist of ECC curves.

12. Non-Recommended Intermediate Curve

Determines whether intermediate ECC curves being used comply with a whitelist of ECC curves.

13. Non-Recommended Root Curve

Determines whether root ECC curves being used comply with a whitelist of ECC curves.

14. Weak Endpoint Hash Algorithm

Determines whether the hash algorithm being used in the endpoint certificate is considered cryptographically weak in view of the current security standards.

15. Weak Intermediate Hash Algorithm

Determines whether the hash algorithm being used in an intermediate certificate is considered cryptographically weak in view of the current security standards.

16. Weak Root Hash Algorithm

Determines whether the hash algorithm being used in the root certificate is considered cryptographically weak in view of the current security standards.

17. Unsupported Key Type

Determines whether the certificate contains a key which is not in the approved whitelist of the key type/exchange algorithms such as RSA, DSA and EC public keys.

18. Unsupported Signature Algorithm

Determines whether the certificate contains a signature algorithm which is not in a approved whitelist of signature algorithms.

Baseline Panel Policies

19. Invalid Endpoint Validity

Determines whether a certificate has exceeded a recommended certificate lifetime.

20. Expired Endpoint

Determines whether the endpoint certificate is past its date of expiry and should not be trusted. The certificate should be removed and a new certificate should be generated with proper validity.

21. Expired Intermediate

Determines whether the intermediate certificate is past its date of expiry and should not be trusted as part of the chain. The certificate should be removed and a new certificate should be generated with proper validity.

22. Expired Root

Determines whether the root certificate is past its date of expiry and should not be trusted anymore. The certificate should be removed and a new certificate should be generated with proper validity.

23. Missing Endpoint Online Certificate Status Protocol (OCSP) Server

Determines whether the endpoint certificate contains the URL for an OCSP server to check the certificate revocation using OCSP calls.

24. Missing Intermediate OCSP Server

Determines whether the intermediate certificate contain the URL for an OCSP server to check the certificate revocation using OCSP calls.

25. Missing Intermediate Authority Certificate

Determines whether the intermediate certificate contains the URL for its issuer's certificate in the AIA extension of x.509.

26. Missing Endpoint AuthorityCertificate

Determines whether the endpoint certificate contains the URL for its issuer's certificate in the AIA extension of x.509.

27. Invalid Intermediate Basic Constraints

Basic constraint is a field on X.509 used to indicate whether the certificate being used is a Certificate Authority or not. Determines whether this field is marked as critical for an intermediate certificate which will be a Certificate Authority.

28. Invalid Root Basic Constraints

Determines whether the basic constraint field is marked as critical for a root certificate issued by a root Certificate Authority.

29. Outdated X509 Root

Determines whether the root certificate is using an outdated version of X509 certificates.

30. Outdated X509 Intermediate

Determines whether the intermediate certificate is using an outdated version of X509 certificates.

31. Outdated X509 endpoint

Determines whether the endpoint certificate is using an outdated version of X509 certificates.

32. CA Constraint Extension in Endpoint

Determines whether an extension meant for Certificate Authority certificates is being used in an endpoint certificate.

33. Non-Standard Endpoint Subject Key Identifier

Determines whether the subject key identifier matches the recommended RFC 5820 methods for x.509. For end entity certificates, the subject key identifier extension provides a means for identifying certificates containing the particular public key used in an application. Where an end entity has obtained multiple certificates, especially from multiple Certificate Authorities, the subject key identifier allows quick identification of the set of certificates containing a particular public key. To assist applications in identifying the appropriate end entity certificate, this extension should be included in all end entity certificates. For end entity certificates, subject key identifiers should be derived from the public key.

34. Non-Standard Intermediate Subject Key Identifier

Determines whether the subject key identifier matches the recommended RFC 5820 methods for x.509. To facilitate certification path construction, this extension appears in all conforming Certificate Authority certificates, that is, all certificates including the basic constraints extension where the value of Certificate Authority is TRUE. The value of the subject key identifier should be the value placed in the key identifier field of the Authority Key Identifier extension of certificates issued by the subject of this certificate.

35. Invalid Endpoint Key Usage

Determines whether the endpoint contains Certificate/CRL signature key usage bits. If the keyUsage extension is present, then the subject public key must not be used to verify signatures on certificates or CRLs unless the corresponding keyCertSign or cRLSign bit is set.

36. Invalid Intermediate Key Usage

Determines whether the intermediate key usage extension is missing Certificate signature or is not critical, in which case it does not conform to RFC 5280 for x.509.

37. Invalid Root Key Usage

Determines whether the root key usage extension is missing Certificate signature or is not critical, in which case it does not conform to RFC 5280 for x.509.

38. Endpoint is a CA

Determines whether the Certificate Authority bit is set on an endpoint certificate.

39. Invalid Endpoint CRL

Determines whether the certificate is missing or presents an erroneous HTTP CRL endpoint.

40. Invalid Intermediate CRL

Determines whether the certificate presents an erroneous HTTP CRL endpoint.

41. Missing Endpoint Policy

Determines whether an endpoint certificate contains an issuance policy.

42. Missing Intermediate Policy

Determines whether an intermediate certificate contains an issuance policy.

43. Missing Endpoint Authority Information Access

Determines whether an endpoint certificate includes authority information access.

44. Missing Intermediate Authority Information Access

Determines whether an intermediate certificate includes authority information access.

45. Missing Endpoint Extended Key Usage

Determines whether an endpoint certificate includes the enhanced key usage extension. This extension indicates one or more purposes for which the certified public key may be used, in addition to or in place of the basic purposes indicated in the key usage extension. In general, this extension will appear only in end entity certificates. The following key usage purposes are defined:

anyExtendedKeyUsage OBJECT IDENTIFIER::={id-ce-extKeyUsage 0}
id-kp OBJECT IDENTIFIER::={id-pkix 3}
id-kp-serverAuth OBJECT IDENTIFIER::={id-kp 1}
  TLS WWW server authentication
  Key usage bits that may be consistent: digitalSignature, keyEncipherment or keyAgreement
id-kp-clientAuth OBJECT IDENTIFIER::={id-kp 2}
  TLS WWW client authentication
  Key usage bits that may be consistent: digitalSignature and/or keyAgreement
id-kp-codeSigning OBJECT IDENTIFIER::={id-kp 3}
  Signing of downloadable executable code
  Key usage bits that may be consistent: digitalSignature
id-kp-emailProtection OBJECT IDENTIFIER::={id-kp 4}
  E-mail protection
  Key usage bits that may be consistent: digitalSignature, nonRepudiation, and/or (keyEncipherment or keyAgreement)
id-kp-timeStamping OBJECT IDENTIFIER::={id-kp 8}
  Binding the hash of an object to a time
  Key usage bits that may be consistent: digitalSignature and/or nonRepudiation
id-kp-OCSPSigning OBJECT IDENTIFIER::={id-kp 9}
  Signing OCSP responses
  Key usage bits that may be consistent: digitalSignature and/or nonRepudiation 46. Missing Endpoint Subject Alternative Name Determines whether an endpoint certificate includes subject alternative names.

47. Missing Intermediate Key Usage

Determines whether an intermediate certificate contains a certificate signature key usage bit set using Key Usage extension.

48. Missing Root Key Usage

Determines whether a root certificate contains a certificate signature key usage bit set using Key Usage extension.

49. Missing Intermediate CRL Distribution

Determines whether an intermediate certificate is missing an HTTP CRL endpoint.

50. Path Length Constraint in Root

Determines whether ae maximum number of Certificate Authorities that can exist below the Certificate Authorities where the basic constraint is assigned has been exceeded.

51. Missing Root Basic Constraints

On a root certificate which issued by a root Certificate Authority, determine whether the extension indicating whether the certificate being used is a Certificate Authority or not is present and marked as critical.

IOC Panel Policies

52. Untrusted Roots on Node

Attackers may install illegitimate root or leaf certificates on service nodes. An illegitimate certificate could allow eavesdropping without triggering any warnings or could also allow attackers to stage a phishing campaign or to run malware code without raising any alarms. This indicator of compromise policy would determine whether each root certificate stored on a service node is found in an organization's trusted list of root certificates. Such a policy would enable early and reliable detection against nation state and other attackers installing illegitimate certificates on service nodes.

53. Known Compromised Certificates on Node

Determines whether any root certificates stored on a service node are found in a trusted list of bad certificates.

54. Anomaly in Key Usage and Extended Key Usage

In a regular PKI operation, a specific domain can be associated with a set of codesigning and authentication certificates which have a known rotation cycle. This policy determines any anomaly in Key Usage or Extended Key Usage for a domain.

55. Invalid/Missing Authority Key Identifier

This extension in leaf certificates enables the chain-building logic in the operating system to find the appropriate intermediate certificate when there are multiple intermediates. It further might help resolve the chain even when two certificates have the same key. The extension has two parameters: key id & serial number.

Other policies may include a policy that facilitates detection of problems in certificate chains other than the one that is selected by the operating system. Execition of such a policy may include construction of all potential certificate chains and providing an alert if any configuration issues are detected in any of the chains (e.g., expired intermediate certificate).

Some embodiments may support production and consumption of organization-specific and custom policies. Some organizations may overload existing certificate properties or create custom certificate extensions, therefore policies may be written to assess and enforce these properties and extensions even though they might not be industry-recognized.

Some embodiments provide for layered/nested policies. Such layering/nesting may require execution of a policy m=based on the results of execution of a first policy. For example, if a policy determines that the key size is <1024 bits, then a second policy may be evaluated to enforce a shorter certificate expiration time (e.g., 90 days) than would otherwise be enforced (e.g., 180 days). This arrangement may assist in phasing out certificates that fail to meet a newer and more stringent organizational standard.

Figure 10:
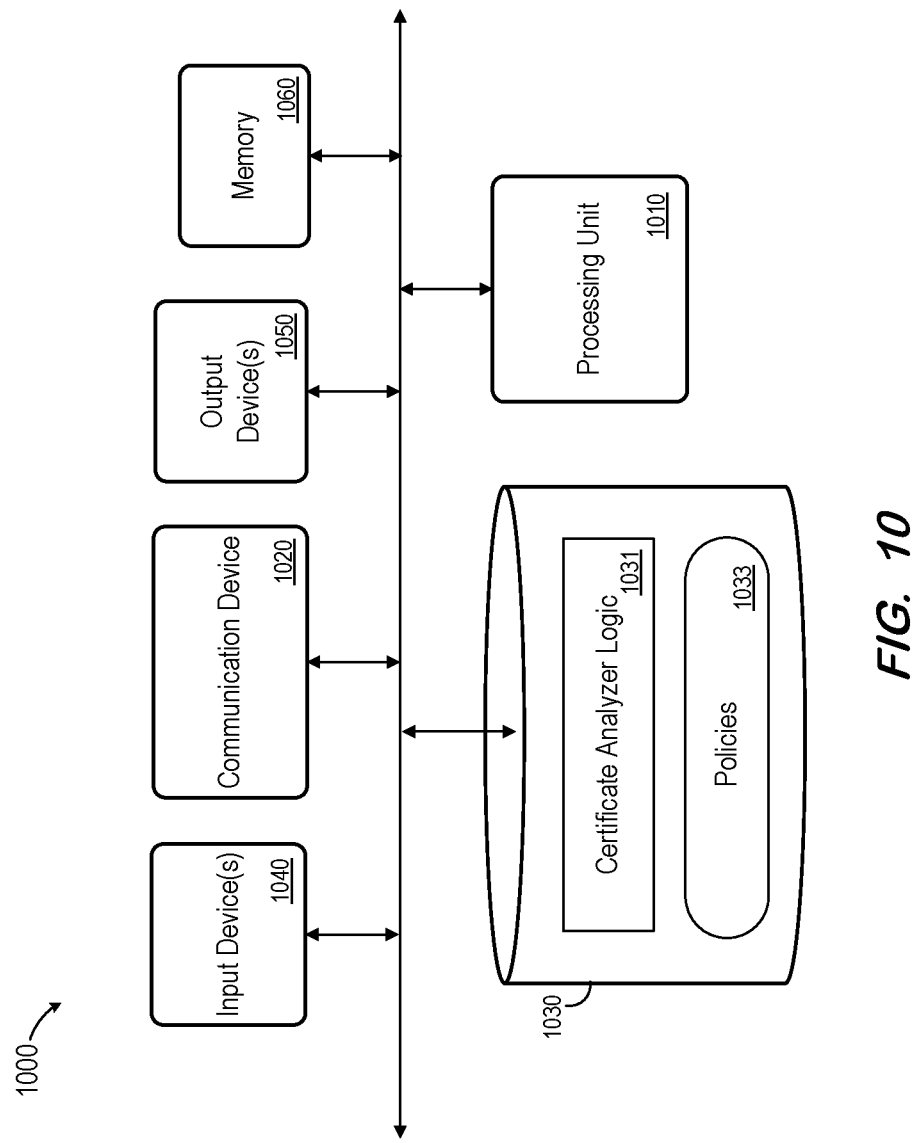
FIG. 10 is a block diagram of an apparatus implementing certificate evaluation according to some embodiments.

FIG. 10 is a block diagram of system 1000 according to some embodiments. System 1000 may comprise a general-purpose computer server and may execute program code to perform any of the functions described herein. System 1000 may comprise an implementation of a certificate authority, a secret store, a monitoring service and/or a service node as described herein. Accordingly, system 1000 may include other elements that are not shown.

System 1000 includes processing unit 1010 operatively coupled to communication device 1020, persistent data storage system 1030, one or more input devices 1040, one or more output devices 1050 and volatile memory 1060. Processing unit 1010 may comprise one or more processors, processing cores, etc. for executing program code. Communication device 1020 may facilitate communication with external devices, such as an external network in communication with the Web. Input device(s) 1040 may comprise, for example, a keyboard, a keypad, a mouse or other pointing device, a microphone, a touch screen, and/or an eye-tracking device. Output device(s) 1050 may comprise, for example, a display (e.g., a display screen), a speaker, and/or a printer.

Data storage system 1030 may comprise any number of appropriate persistent storage devices, including combinations of magnetic storage devices (e.g., magnetic tape, hard disk drives and flash memory), optical storage devices, Read Only Memory (ROM) devices, etc. Memory 1060 may comprise Random Access Memory (RAM), Storage Class Memory (SCM) or any other fast-access memory.

Certificate analyzer logic 1031 may comprise program code executed by processing unit 1010 to cause system 1000 to perform any one or more of the processes described herein. For example, execution of certificate analyzer logic 1031 may cause acquisition of public key certificates, determination of policies based on policies 1033, and evaluation or enforcement of the public key certificates with respect to the determined policies. Data storage device 1030 may also store data and other program code for providing additional functionality and/or which are necessary for operation of system 1000, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A system comprising:
   a public key certificate issuance system to generate public key certificates, the public key certificate issuance system comprising:
   first data files associated with first public key certificate policies; and
   first processor-executable process steps stored on a non-transitory computer-readable medium and comprising a first copy of processor-executable process steps of an analyzer engine, a first copy of processor-executable process steps of a policy engine, and a first wrapper, the first processor-executable process steps executable by a processing unit of the public key certificate issuance system to:
   determine the first public key certificate policies based on the first data files; and
   generate a first public key certificate conforming to the first public key certificate policies; and
   a secret store system to store public key certificates, the secret store system comprising:
   second data files associated with second public key certificate policies; and
   second processor-executable process steps stored on a non-transitory computer-readable medium and comprising a second copy of the processor-executable process steps of the analyzer engine, a second copy of the processor-executable process steps of the policy engine, and a second wrapper, the second processor-executable process steps executable by a processing unit of the secret store system to:
   receive the first public key certificate;
   determine the second public key certificate policies based on the second data files; and
   determine whether the received first public key certificate conforms to the public key certificate policies.

2. A system according to claim 1, wherein the first data files comprise a policy configuration file comprising one or more policy definitions and a global configuration file comprising cryptographic standards associated with each of the one or more policy definitions, and
   wherein determination of the first public key certificate policies comprises generation of the first public key certificate policies based on the one or more policy definitions and the associated cryptographic standards.

3. A system according to claim 2, wherein the first copy of processor-executable process steps of the policy engine are executable by the processing unit of the public key certificate issuance system to determine the first public key certificate policies based on the first data files, and wherein the second copy of processor-executable process steps of the policy engine are executable by the processing unit of the secret store system to determine the second public key certificate policies based on the second data files.

4. A system according to claim 1, further comprising:
   a monitoring system comprising:
   third data files associated with third public key certificate policies; and
   third processor-executable process steps stored on a non-transitory computer-readable medium and comprising a third copy of processor-executable process steps of the analyzer engine, a third copy of processor-executable process steps of the policy engine, and a third wrapper, the first executable by a processing unit of the monitoring system to:
   receive the first public key certificate from the secret store system;
   determine the third public key certificate policies based on the third data files; and
   determine whether the first public key certificate conforms to the third public key certificate policies.

5. A system according to claim 4, wherein the first copy of processor-executable process steps of the policy engine are executable by the processing unit of the public key certificate issuance system to determine the first public key certificate policies based on the first data files, the second copy of processor-executable process steps of the policy engine are executable by the processing unit of the secret store system to determine the second public key certificate policies based on the second data files, and the third copy of processor-executable process steps of the policy engine are executable by the processing unit of the monitoring system to determine the third public key certificate policies based on the third data files, and
   wherein the second copy of processor-executable process steps of the analyzer engine are executable by the processing unit of the secret store system to determine whether the first public key certificate conforms to the second public key certificate policies, and the third copy of processor-executable process steps of the first analyzer engine are executable by the processing unit of the monitoring system to determine whether the first public key certificate conforms to the third public key certificate policies.

6. A system according to claim 1, further comprising:
   a service node comprising:
   a storage system to store service node public key certificates;

fourth data files associated with fourth public key certificate policies; and
third processor-executable process steps stored on a non-transitory computer-readable medium and comprising a third copy of processor-executable process steps of the analyzer engine, a third copy of processor-executable process steps of the policy engine, and a third wrapper, the third processor-executable process steps executable by a processing unit of the service node to:
retrieve a service node public key certificate from the storage system;
determine the fourth public key certificate policies based on the fourth data files; and
determine whether the service node public key certificate conforms to the fourth public key certificate policies.

7. A system according to claim 6, further comprising:
a second service node comprising:
a second storage system to store second service node public key certificates;
fifth data files associated with fifth public key certificate policies; and
fourth processor-executable process steps stored on a non-transitory computer-readable medium and comprising a fourth copy of processor-executable process steps of the analyzer engine, a fourth copy of processor-executable process steps of the policy engine, and a fourth wrapper, the fourth processor-executable process steps executable by a processing unit of the second service node to:
retrieve a second service node public key certificate from the second storage system;
determine the fifth public key certificate policies based on the fifth data files; and
determine whether the second service node public key certificate conforms to the fifth public key certificate policies.

8. A system according to claim 7, further comprising:
a third service node comprising:
a third storage system to store third service node public key certificates;
sixth data files associated with sixth public key certificate policies; and
fifth processor-executable process steps stored on a non-transitory computer-readable medium and comprising a fifth copy of processor-executable process steps of the analyzer engine, a fifth copy of processor-executable process steps of the policy engine, and a fifth wrapper, the fifth processor-executable process steps executable by a processing unit of the third service node to:
retrieve a third service node public key certificate from the third storage system;
determine the sixth public key certificate policies based on the sixth data files; and
determine whether the third service node public key certificate conforms to the sixth public key certificate policies,
wherein the fourth public key certificate policies are different from the fifth public key certificate policies, and wherein the fourth public key certificate policies are identical to the sixth public key certificate policies.

9. A system according to claim 6, further comprising:
a monitoring system comprising:
third data files associated with third public key certificate policies; and
fourth processor-executable process steps stored on a non-transitory computer-readable medium and comprising a fourth copy of processor-executable process steps of the analyzer engine, a fourth copy of processor-executable process steps of the policy engine, and a fourth wrapper, the fourth processor-executable process steps executable by a processing unit of the monitoring system to:
receive the first public key certificate from the secret store system;
determine the third public key certificate policies based on the second data files; and
determine whether the first public key certificate conforms to the third public key certificate policies.

10. A computer-implemented method comprising:
executing a first copy of processor-executable process steps of an analyzer engine, a first copy of processor-executable process steps of a policy engine, and a first wrapper at a public key certificate issuance system to:
determine first public key certificate policies based on first data files;
generate a first public key certificate conforming to the first public key certificate policies; and
store the first public key certificate in a secret store system; and
executing a second copy of processor-executable process steps of the analyzer engine, a second copy of processor-executable process steps of the policy engine, and a second wrapper at a secret store system to:
receive the first public key certificate;
determine second public key certificate policies based on second data files stored in the secret store system;
determine whether the received second public key certificate conforms to the public key certificate policies; and
store the second public key certificate in the secret store system if it is determined that the received first public key certificate conforms to the second public key certificate policies.

11. A method according to claim 10, wherein the first data files comprise a policy configuration file comprising one or more policy definitions and a global configuration file comprising cryptographic standards associated with each of the one or more policy definitions, and
wherein determining the first public key certificate policies comprises generating the first public key certificate policies based on the one or more policy definitions and the associated cryptographic standards.

12. A method according to claim 10, further comprising:
executing a third copy of processor-executable process steps of the analyzer engine, a third copy of processor-executable process steps of the policy engine, and a third wrapper at a monitoring system to:
receive the first public key certificate from the secret store system;
determine third public key certificate policies based on third data files; and
determine whether the first public key certificate conforms to the third public key certificate policies.

13. A method according to claim 10, further comprising:
executing a third copy of processor-executable process steps of the analyzer engine, a third copy of processor-executable process steps of the policy engine, and a third wrapper at a service node to:
retrieve a service node public key certificate from a service node storage system;
determine fourth public key certificate policies based on fourth data files; and determine whether the service node public key certificate conforms to the fourth public key certificate policies.

14. A method according to claim 13, further comprising:

executing a fourth copy of processor-executable process steps of the analyzer engine, a fourth copy of processor-executable process steps of the policy engine, and a fourth wrapper at a second service node to:

retrieve a second service node public key certificate from a second service node storage system;

determine fifth public key certificate policies based on fifth data files; and determine whether the second service node public key certificate conforms to the fifth public key certificate policies, wherein the fourth public key certificate policies are different from the fifth public key certificate policies.

15. A method according to claim 13, further comprising:

executing a fourth copy of processor-executable process steps of the analyzer engine, a fourth copy of processor-executable process steps of the policy engine, and a fourth wrapper at a monitoring system to:

receive the second public key certificate from the secret store system;

determine third public key certificate policies based on third data files; and determine whether the second public key certificate conforms to the third public key certificate policies.

\* \* \* \* \*